United States Patent
Alsing et al.

(10) Patent No.: US 6,362,850 B1
(45) Date of Patent: Mar. 26, 2002

(54) INTERACTIVE MOVIE CREATION FROM ONE OR MORE STILL IMAGES IN A DIGITAL IMAGING DEVICE

(75) Inventors: Carl J. Alsing, Scotts Valley; Eric C. Anderson, San Jose, both of CA (US)

(73) Assignee: FlashPoint Technology, Inc., Peterborough, NH (US)

( * ) Notice: Subject to any disclaimer, the term of this patent is extended or adjusted under 35 U.S.C. 154(b) by 0 days.

(21) Appl. No.: 09/129,140

(22) Filed: Aug. 4, 1998

(51) Int. Cl.$^7$ .............................................. H04N 5/262

(52) U.S. Cl. ...................................... 348/239; 348/578

(58) Field of Search ......................... 348/571, 121–124, 348/578, 580–582, 584–587, 239; H04N 7/00, 9/75, 5/265, 5/225, 5/262

(56) References Cited

U.S. PATENT DOCUMENTS

| 4,694,345 A | * | 9/1987 | Rodgers | |
| 4,750,888 A | * | 6/1988 | Allard et al. | 434/69 |

FOREIGN PATENT DOCUMENTS

| GB | 2160748 | * | 12/1985 | 358/83 |
| JP | 5-207502 | * | 8/1993 | H04N/9/75 |
| JP | 6-133221 | * | 5/1994 | H04N/5/265 |
| WO | 34195 | * | 8/1998 | |

* cited by examiner

Primary Examiner—David E. Harvey
(74) Attorney, Agent, or Firm—Sawyer Law Group LLP

(57) ABSTRACT

A method and system for interactively creating a movie from a still image in a digital imaging device that includes a display screen. The method and system include determining a path of panning across the still image, generating image frames along the path of panning, and then displaying the image frames for a predetermined time interval on the display screen to play the movie.

35 Claims, 9 Drawing Sheets

INTERACTIVE MOVIE CREATION FROM ONE OR MORE STILL IMAGES IN A DIGITAL IMAGING DEVICE

FIELD OF THE INVENTION

The present invention relates generally to digital imaging devices, and more particularly to a method and system for interactively creating a movie from one or more images in such a device.

BACKGROUND OF THE INVENTION

The use of digital video cameras and digital still cameras is becoming widespread. Digital video cameras differ from digital still cameras in a number of respects. Digital video cameras capture approximately thirty frames per second and are optimized to capture a large amount of moving images, but sacrifice image quality. That is, digital video cameras typically capture thirty low-resolution 640×480 images per second. However, the uncompressed digital video signals from all those low resolution images require huge amounts memory storage, and high-ratio real-time compression schemes, such as MPEG, are essential for providing digital video for today's computers. Unfortunately, the hardware to support such processing is expensive, placing most digital video cameras outside the reach of most consumers.

Still digital cameras offer a less expensive alternative to digital video cameras, but are used primarily for capturing high quality static photographs. Still digital cameras are less expensive because they have far less processing power and memory capacity than digital video cameras. Even with these limitations, some still digital cameras are also capable of capturing sequential images, such as a burst image. A burst image is a series of images captured in rapid succession, such as 3 images per second, for instance.

A typical still digital camera equipped with an LCD screen operates in two modes, capture or record mode for capturing images, and play mode for playing back the captured images on the LCD screen. Unfortunately, even still digital cameras capable of capturing burst images are incapable of displaying the images comprising the burst in play mode as a movie. One reason it is that a burst image usually includes only 3–8 images and therefore does not have a sufficient number of images to display as a movie. And even if there were enough images to play as a movie, the camera would be incapable of displaying the images at the high frame rate required for a movie presentation. This is because the camera would have to retrieve each image from memory, decompress, resize and then display each image. Due to the limited resources of today's still digital cameras, the display of a burst image resembles more of a slide show than a movie.

Accordingly, what is needed is a method and system for interactively creating a movie from one or more still images in a digital camera. The present invention addresses such a need.

SUMMARY OF THE INVENTION

The present invention provides a method and system for interactively creating a movie from a still image in a digital imaging device that includes a display screen. The method and system include determining a path of panning across the still image, generating a plurality of image frames along the path of panning, and then displaying the plurality image frames for a predetermined time interval on the display screen to present the movie.

In a preferred embodiment of the present invention, the path of panning is determined by the user placing several key frames on the still images. By varying the sizes of the key frames, the user may also control the amount of zoom between the key frames. After the key frames are defined, the camera automatically interpolates a series of image frames between each pair of key frames to provide a sufficient number of frames to play during the duration of the movie. In another aspect of the present invention, a movie is created from a group of images by cross fading the movies as a function of time. The resulting movie appears much smoother than it would otherwise because abrupt scene changes between each of the images in the groups are minimized by the cross fading transitions between the group of images. According to the present invention, high-frame rate movie presentations are created from a low frame-rate still digital camera having limited storing capacity.

DETAILED DESCRIPTION OF THE INVENTION

The present invention relates to a method and system for generating a digital movie from digital still images. The following description is presented to enable one of ordinary skill in the art to make and use the invention and is provided in the context of a patent application and its requirements. Although the present invention will be described in the context of a still digital camera, various modifications to the preferred embodiment will be readily apparent to those skilled in the art and the generic principles herein may be applied to other embodiments. That is, any digital imaging device which captures, stores, or displays digital images, could incorporate the features described hereinbelow and that device would be within the spirit and scope of the present invention. Thus, the present invention is not intended to be limited to the embodiment shown but is to be accorded the widest scope consistent with the principles and features described herein.

Figure 1:
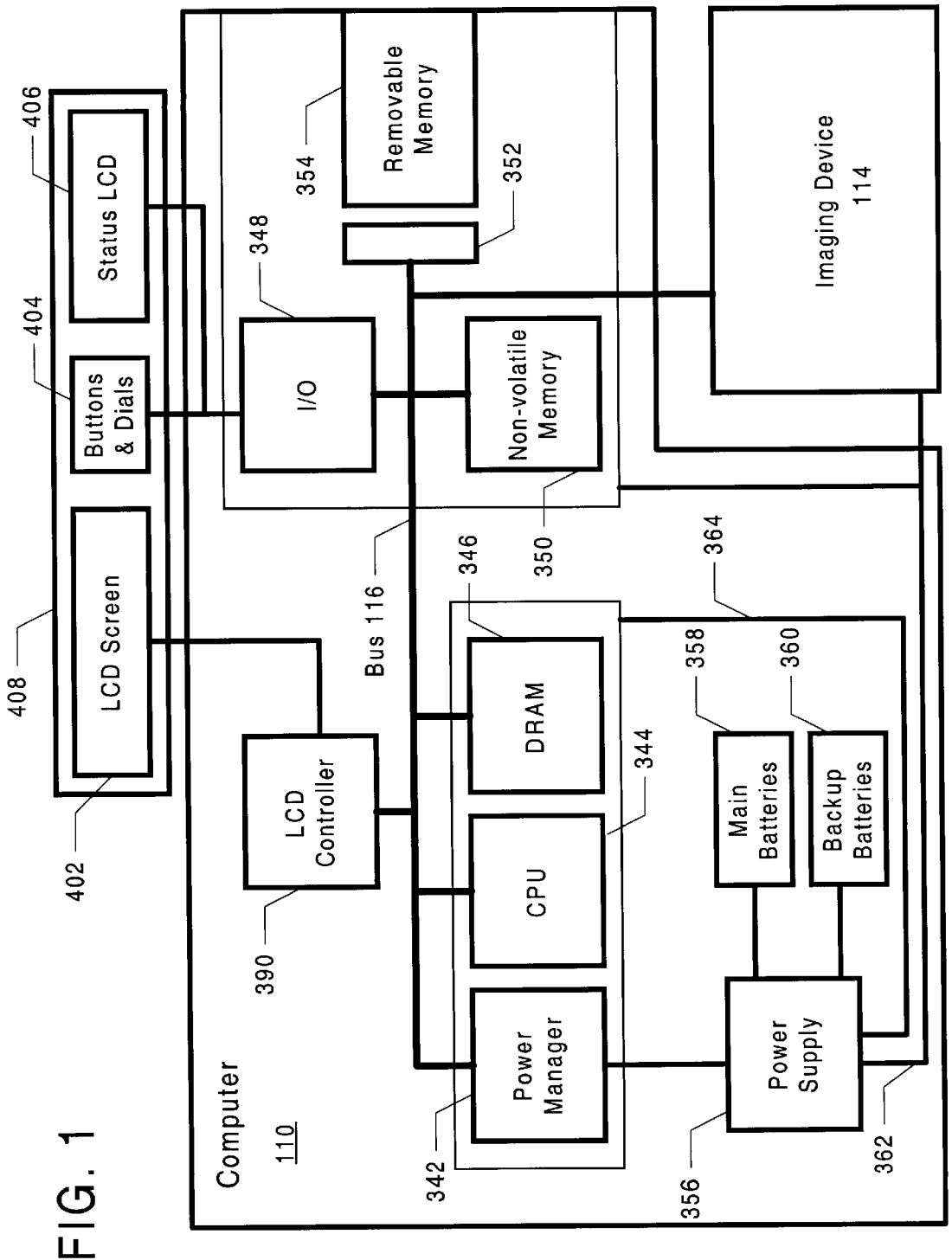
FIG. 1 is a block diagram of a digital camera that operates in accordance with the present invention.

Referring now to FIG. 1, a block diagram of one preferred embodiment of a digital camera 110 is shown for use in accordance with the present invention. Camera 110 preferably comprises an imaging device 114, a system bus 116 and a computer 118. Imaging device 114 includes an image sensor, such as a charged coupled device (CCD) or a CMOS sensor, for generating a set of raw image data representing a captured image. In a preferred embodiment, system bus 116 provides connection paths between imaging device 114, an optional power manager 342, central processing unit (CPU) 344, dynamic random-access memory (DRAM) 346, input/output interface (I/O) 348, non-volatile memory 350, and buffers/connector 352 that connect an optional removable memory 354 to system bus 116.

CPU 344 may include a conventional microprocessor device for controlling the operation of camera 110. In the preferred embodiment, CPU 344 is capable of concurrently running multiple software routines to control the various processes of camera 110 within a multithreaded environment. For example, images may be captured at the same time that previously captured images are processed in the background to effectively increase the capture rate of the camera. In a preferred embodiment, CPU 244 runs a operating system that includes a menu-driven GUI and provides image processing through software, rather than hardware. An example of such software is the Digita™ Operating Environment by FlashPoint Technology of San Jose, Calif. Although CPU 344 is preferably a microprocessor, one or more DSP's (digital signal processor) or ASIC's (Application Specific Integrated Circuit) could also be used.

I/O 348 is an interface device allowing communications to and from computer 118. For example, I/O 348 permits an external host computer (not shown) to connect to and communicate with computer 118. I/O 348 also interfaces with a plurality of buttons and/or dials 404, and an optional status LCD 406, which in addition to the LCD screen 402, are the hardware elements of the camera's user interface 408.

Non-volatile memory 350, which may typically comprise a conventional read-only memory or flash memory, stores a set of computer-readable program instructions to control the operation of camera 110. Removable memory 354 serves as an additional image data storage area and is preferably a non-volatile device, such a flash disk, readily removable and replaceable by a camera 110 user via buffers/connector 352.

Power supply 356 supplies operating power to the various components of camera 110. Power manager 342 communicates via line 366 with power supply 356 and coordinates power management operations for camera 110. In the preferred embodiment, power supply 356 provides operating power to a main power bus 362 and also to a secondary power bus 364. The main power bus 362 provides power to imaging device 114, I/O 348, non-volatile memory 350 and removable memory 354. The secondary power bus 364 provides power to power manager 342, CPU 344 and DRAM 346.

Power supply 356 is connected to main batteries 358 and also to backup batteries 360. In the preferred embodiment, a camera 110 user may also connect power supply 356 to an external power source. During normal operation of power supply 356, the main batteries 358 provide operating power to power supply 356 which then provides the operating power to camera 110 via both main power bus 362 and secondary power bus 364. During a power failure mode in which the main batteries 358 have failed (when their output voltage has fallen below a minimum operational voltage level) the backup batteries 360 provide operating power to power supply 356 which then provides the operating power only to the secondary power bus 364 of camera 110.

Dynamic Random-Access-Memory (DRAM) 346 is a contiguous block of dynamic memory that may be selectively allocated for various storage functions. DRAM 346 stores both raw and compressed image data and is also used by CPU 344 while executing the software routines used within computer 118. The raw image data received from imaging device 114 is temporarily stored in several input buffers (not shown) within DRAM 346. Once the raw image data is processed, it is stored in a frame buffer (not shown) for display on the LCD screen 402. In a preferred embodiment, the input buffers and the frame buffer are split into two ping-pong buffers to improve the display speed of the digital camera and to prevent the tearing of the image in the display 402. After processed image data has been stored in DRAM 346, LCD controller 390 transfers the image data to LCD screen 402 for display.

Figure 2A:
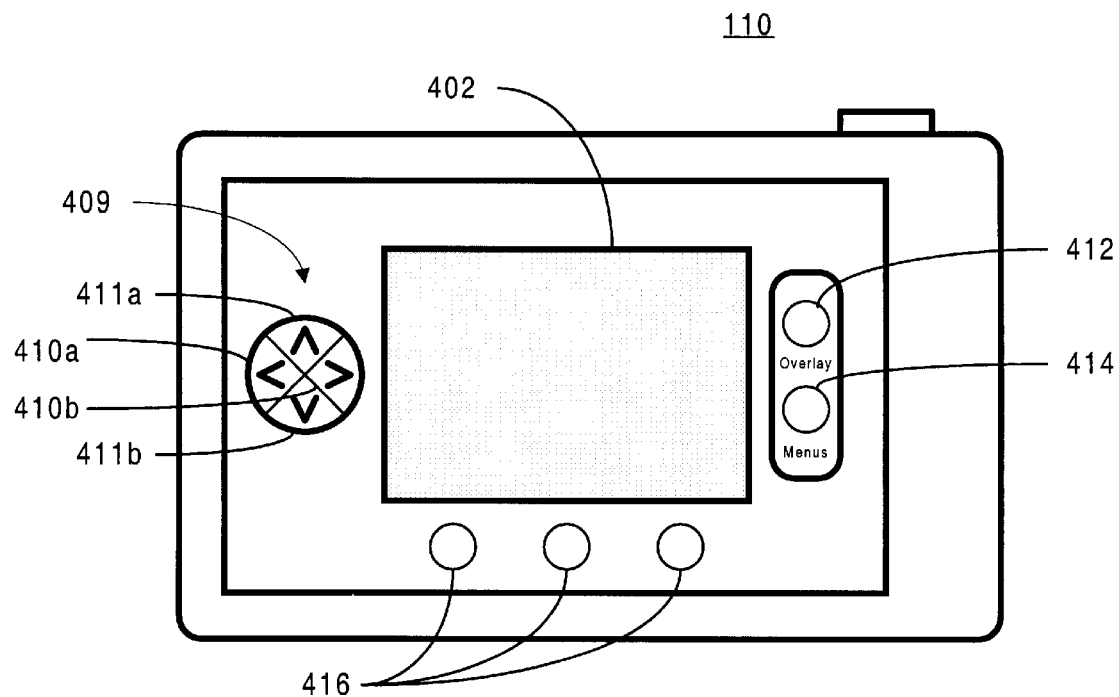
FIGS. 2A and 2B are diagrams depicting exemplary hardware components of the camera's user interface.
Figure 2B:
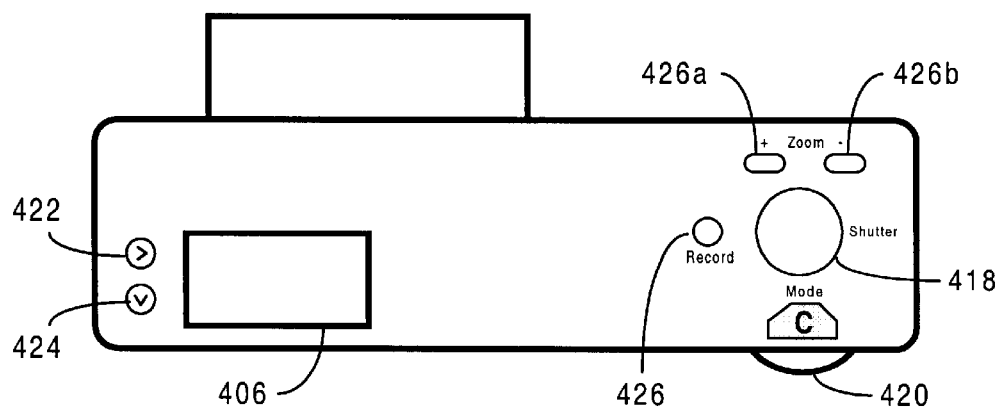

FIGS. 2A and 2B are diagrams depicting exemplary hardware components of the camera's user interface 408. FIG. 2A is back view of the camera 110 showing the LCD screen 402, a four-way navigation control button 409, an overlay button 412, a menu button 414, and a set of programmable soft keys 416. FIG. 2B is a top view of the camera 110 showing a shutter button 418, and a mode dial 420. The camera may optionally include status LCD 406, status LCD scroll and select buttons 422 and 424, a sound record button 426, and zoom-in, zoom-out buttons 426a and 426b.

The camera operates in at least two modes, capture mode for capturing images, and play mode for playing back the captured images on the LCD screen 402. In a preferred embodiment, the camera is capable of capturing single still images as well as sequential images, which are objects comprising multiple images. Examples of a sequential image include a panorama image, a burst image, and a time lapse image. A panorama image comprises several overlapping images of a larger scene. A burst image is a series of images captured in rapid succession, such as 3 images per second, for instance. And a time lapse image is a series of images automatically captured by the camera at predefined time intervals for a defined duration (e.g. capturing a picture every five minutes for an hour.

Although the camera is capable of capturing sequential images, such as burst images, and time lapse images, the camera can only play the objects back at a relatively slow frame rate because each image must be retrieved from memory, decompressed, resized and then displayed. The play back of a burst image or a time lapse resembles more of a slide show than a movie. And since the images are taken at such disparate times, there is insufficient continuity between the images to provide smooth video play back even if the camera had the capability of displaying the images at a high frame rate.

The present invention is a method and system for interactively creating a movie from one or more images in a digital camera. According to the present invention, a panning and zooming path of a set of small frames is defined across a still image. Thereafter, a number of image frames is generated between the key image frames, such that when the sequence of frames is displayed at regular time intervals, it appears similar to a panning motion picture. A movie can also be created from several still images taken at different times and of adjacent (or the same) view using a similar technique. The resulting frames from each of the still images are then appended together to create a longer presentation. According to the present invention, the user may control the placements of the frames, zooms, time intervals, and other photographic parameters to create the desired motion effects.

Figure 3:
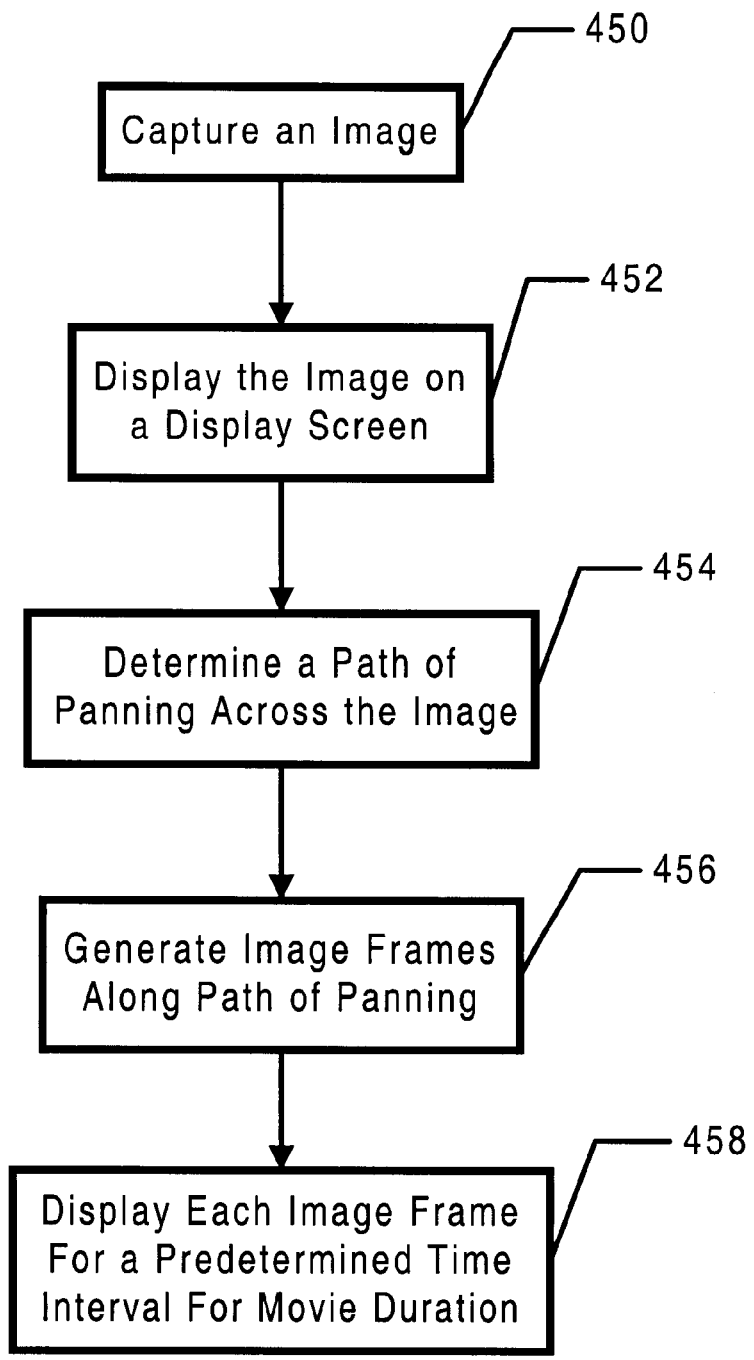
FIG. 3 is a flow chart illustrating the basic process of creating a movie from a still image in accordance with the present invention.

FIG. 3 is a flow chart illustrating the basic process of creating a movie from a still image in accordance with the present invention. Initially, the user places the camera in capture mode and captures a desired image in step 450. The user then switches the camera to play mode to display the captured image or a previously captured image on the LCD screen 402 in step 452.

Figure 4A:
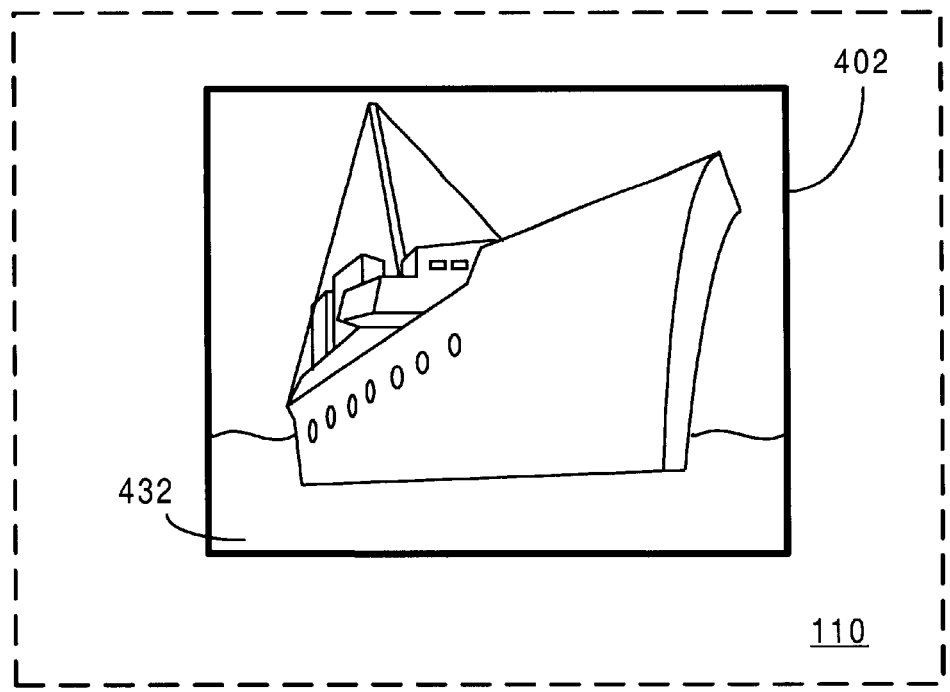
FIGS. 4A and 4B are diagrams showing an example image displayed on the LCD screen in play mode.
Figure 4B:
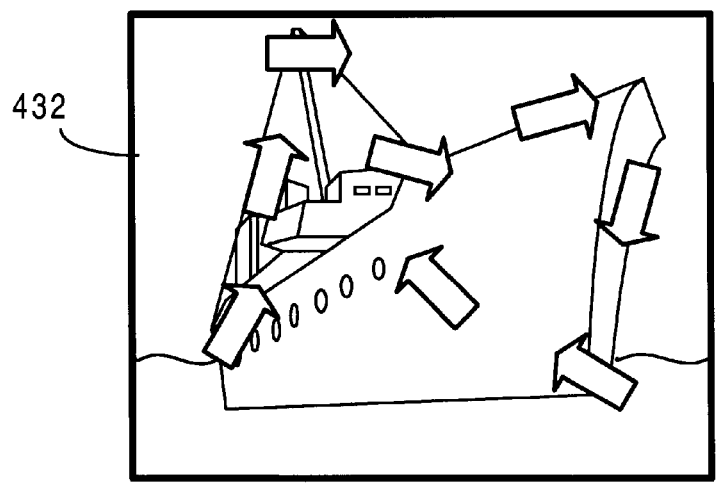

FIG. 4A is a diagram showing an example image 432 displayed on the LCD screen 402 in play mode. Referring again to FIG. 3, once the image is displayed, a path of panning and zooming across the image is determined in step 454. The path of panning defines how the finished movie will appear to the user to sweep across the scene depicted in the image. FIG. 4B is a diagram illustrating an example path of panning across image 432 shown by the arrows.

According to the present invention, a path of zooming may also be determined along the path of panning. Whereas the path of panning simulates the motion of a movie camera across a scene, the zoom path simulates the amount by which the movie zooms in and out of the scene.

In a preferred embodiment, the path of panning is manually determined by the user through the placement of a sequence of icons in the image that identifies key image frames. The location of the key image frames in relation to each other determines the panning path. In one preferred embodiment, the size of the key image frames may be controlled by the user, which in turn determines the zoom path; a larger key image frame followed by a smaller key image frame simulates zooming in on a scene. In a second preferred embodiment, a zoom function is not provided to simplify the process, in which case the size of the key image frames are made constant.

Figure 5A:
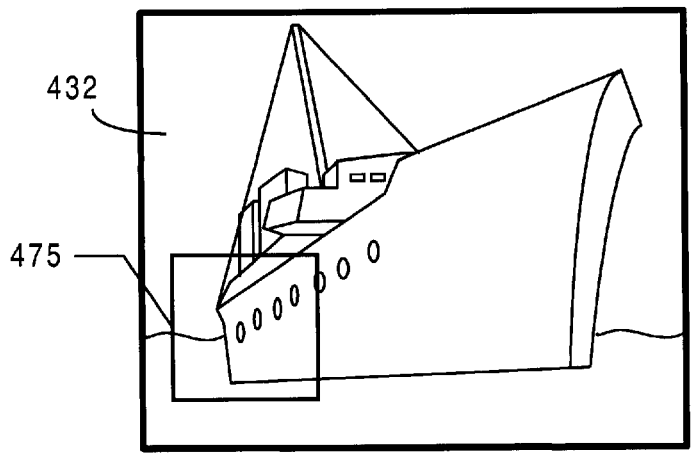
FIGS. 5A–5F are diagrams illustrating the process of defining a panning and zooming path by the placing a sequence of key image frames within an image.
Figure 5B:
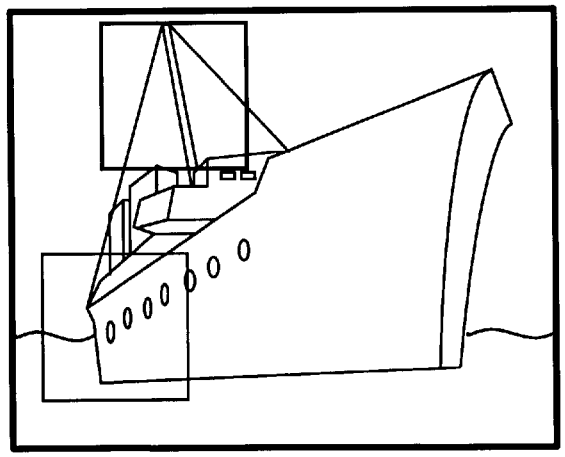
Figure 5C:
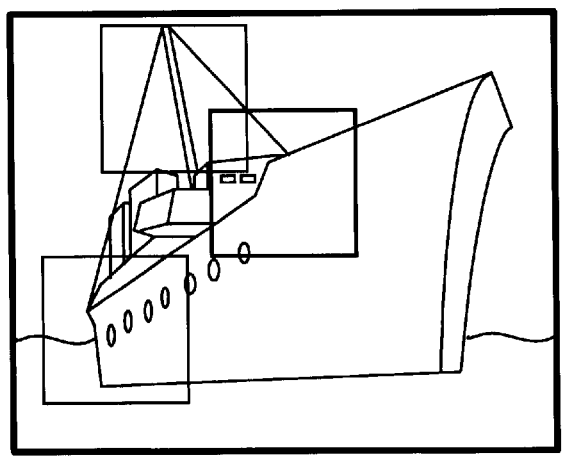
Figure 5D:
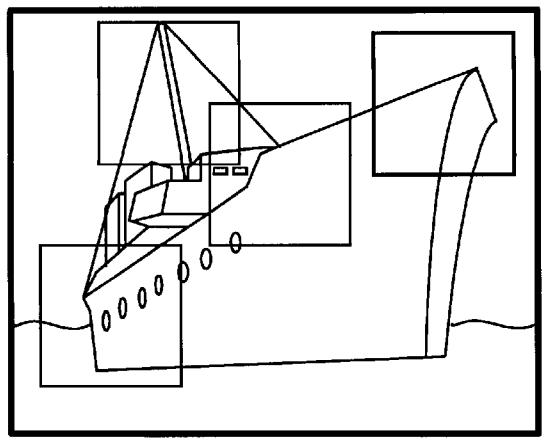
Figure 5E:
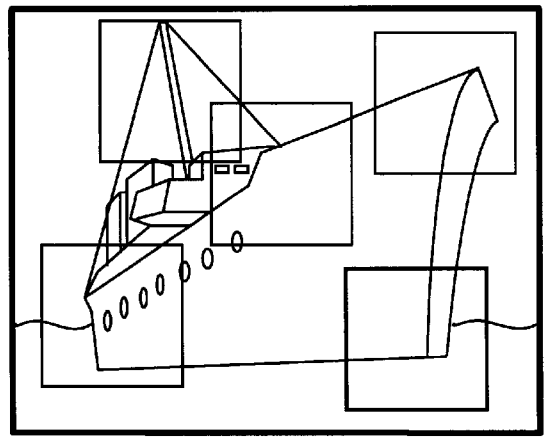
Figure 5F:
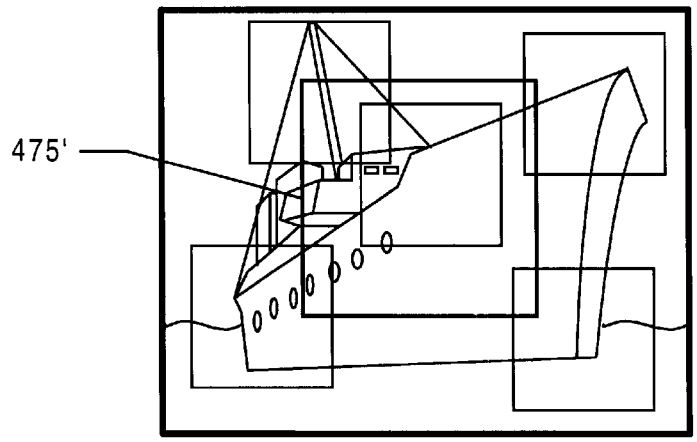

FIGS. 5A–5F are diagrams illustrating the process of a user defining the panning and zooming path shown in FIG. 4B by the placing a sequence of key image frames within image 432. In FIG. 5A, the user begins by defining the starting point of the movie by placing the first key image frame 475 in image 432. Key image frames two through five are then placed as shown in FIGS. 5B–5E, respectively, and the user places the last key image frame 475' that will end the movie in FIG. 5F. Notice the last key image frame 475' is larger the previous frame. This will cause a zoom-out effect near end of the movie when it is played.

Referring again to FIG. 3, after the path of panning and zooming has been determined, the camera generates image frames along the path in step 456. This is accomplished by generating image frames between each adjacent pair of key image frames.

Figure 6:
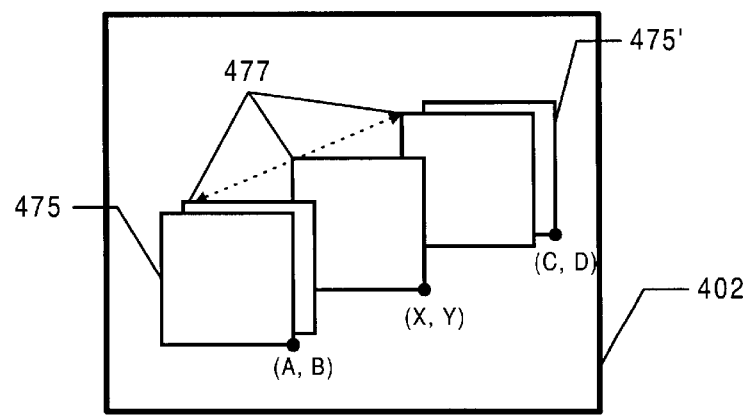
FIG. 6 is a diagram illustrating several image frames between an adjacent pair of key image frames.

FIG. 6 is a diagram illustrating several image frames 477 generated between an adjacent pair of key image frames 475. Generating the image frames 477 requires calculating: 1) the number of frames to generate between each pair of key image frames 475, 2) the position of each image frame 477 on the image, and optionally, 3) the size of each image frame 477 which determines the zoom factor.

The number of image frames 477 to generate between the key image frames 475 will be dependent upon the following combination of variables: 1) the frame rate at which the movie will be displayed and the duration of the movie; or 2) the frame rate at which the movie will be displayed and a time stamp associated with each key image frame. Each of the above variables may be either preset or entered by the user. The actual equations for calculating the number of image frames 477 from these variables would be readily apparent to those skilled in the art.

After the number of image frames 477 to generate between each pair of adjacent key image frames 475 is calculated, the position of each of the image frames 477 on the image 432 is determined using pixel coordinates. Referring still to FIG. 6, the X, Y position of the $N^{th}$ image frame 477 out of M total image frames 477 can be calculated by:

$$X=A+N(C-A)/(M-1)$$

$$Y=B+N(D-B)/(M-1)$$

However, a computationally faster method is used to calculate the positional X, Y offset ($\Delta$) between each of the frames by calculating:

$$\Delta X=(C-A)/(M+1)$$

$$\Delta Y=(D-B)/(M+1)$$

The X, Y position of the $N^{th}$ image frame 477 is then derived by adding $\Delta X$ and $\Delta Y$ to the position of N–1 image frame.

It should be noted that the above equations described above simulate panning between key image frames 475 as a linear function. However, the panning path may be simulated more naturally using a curve fitting function, such as a Bezier or b-spline function, for example.

As stated previously, the size of the key image frames 475 may be used to simulate a camera zooming in or out of the original image. The size of the image frames 477 between a pair of adjacent key image frames 475 can be determined by calculating the slopes between the four corners of the adjacent key image frames 475, and then using the slopes to determine the boundaries of the image frames 477.

Referring again to FIG. 3, after generating each image frame 477, the image frame 477 is displayed on the LCD screen 402 for a predetermined time interval (e.g. 1/30 of a second or 30 fps) in step 458. In a preferred embodiment, each frame is discarded after it is displayed to reduce storage requirements. Alternatively, the frames may be displayed after they have all been processed and stored.

Just before displaying image frame 477, the image data within the frames from the original image may be resized to fit the LCD screen 402. Displaying the image frames 477 full-sized on the LCD screen 402 at a high frame appears to the user as a smooth panning movie.

Figure 7:
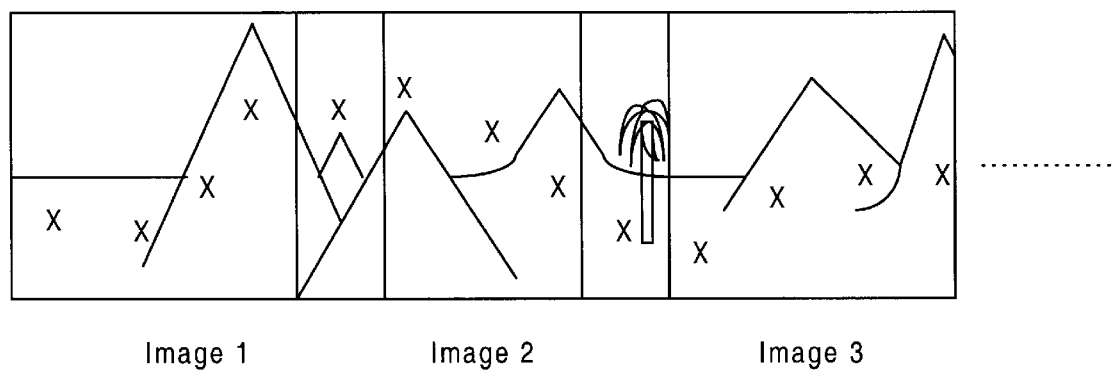
FIGS. 7 and 8 are diagrams illustrating the creation of a movie from a group of still images in accordance with the present invention.

A graphical user interface (GUI) may be used to assist the user in defining desired processing parameters, automate some or all of the desired processes, and record the prescribed processing parameters. The GUI may be implemented in a variety of ways and a detailed discussion of the GUI is outside the scope of this discussion. However, it should be noted that different types of icons may be used to mark the path of panning and zooming across the image, as shown in FIG. 4B and FIG. 7. In the case where the panning and zooming path is preset by the camera, or chosen by the user through the placement of icons, the key image frames 475 may be transparently generated along the prescribed panning path.

Once the specified processing parameters and sequences are recorded, the image processing can be performed each time the movie is presented for viewing, thus requiring less storage memory, as described above. The storage memory need only contain the original still image(s) and the processing parameters. Alternatively, the image processing can be carried out to create the movie, and the movie can be stored as a multimedia object for subsequent playback.

Figure 8:
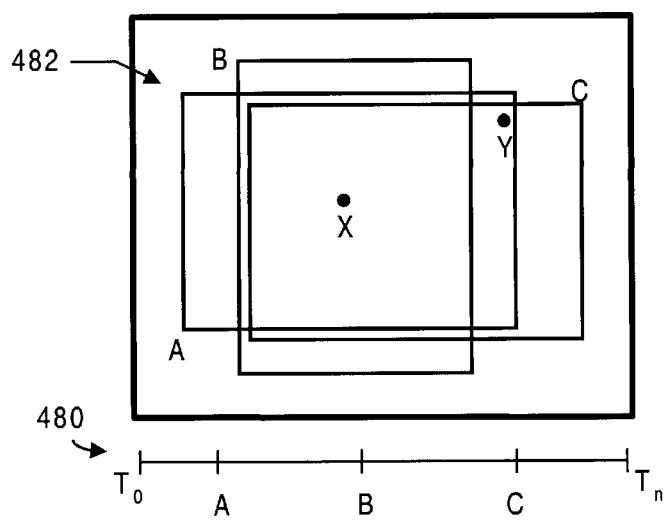

Referring now to FIGS. 7 and 8, diagrams illustrating the creation of a movie from a group of still images in accordance with the present invention are shown. FIG. 7 illustrates the creation of a movie from a panorama image comprising several partially overlapping images of a larger scene. In this case, the user can create a panning motion that traverses the entire scene. If the panorama included enough images to form a 360° pattern, then a panning motion could be created that continuously spirals across the panorama.

FIG. 8 is a diagram illustrating the creation of a movie from a group of images, which may comprise a sequential image or represent several still images taken of substantially the same subject matter, but with different zoom settings and/or camera orientations. The group may also represent totally unrelated still images that the user has manually grouped for some reason. The images in the group, shown here as images A, B, and C, were taken at different times along time line 480. Thus, each image in the group is associated with a different time. In the case where the images are unrelated, the user may manually associate the images with a time stamp.

The problem with creating a movie from such a group of images is that abrupt scene changes occur due to the time difference between the images. For example, assume images A, B and C represent a burst image of a marching band, where the first image shows the band member's left leg up and the second and third images show the band member's right leg up.

In one embodiment, a movie could be created from images A, B and C by defining a key image frame 477 on each of the three images and then generating image frames 477 between each pair of key image frames 475. The image frames 477 between the first and second key image frames 475 would be created from the pixels from the first image, and the image frames 477 between the second and third key image frames 475 would be created from the pixels from the second image. When the image frames 477 are then played, the movie will not appear smooth and continuous even if played at 30 fps because of the abrupt scene change that occur between key image frames 475 one and two.

Figure 9:
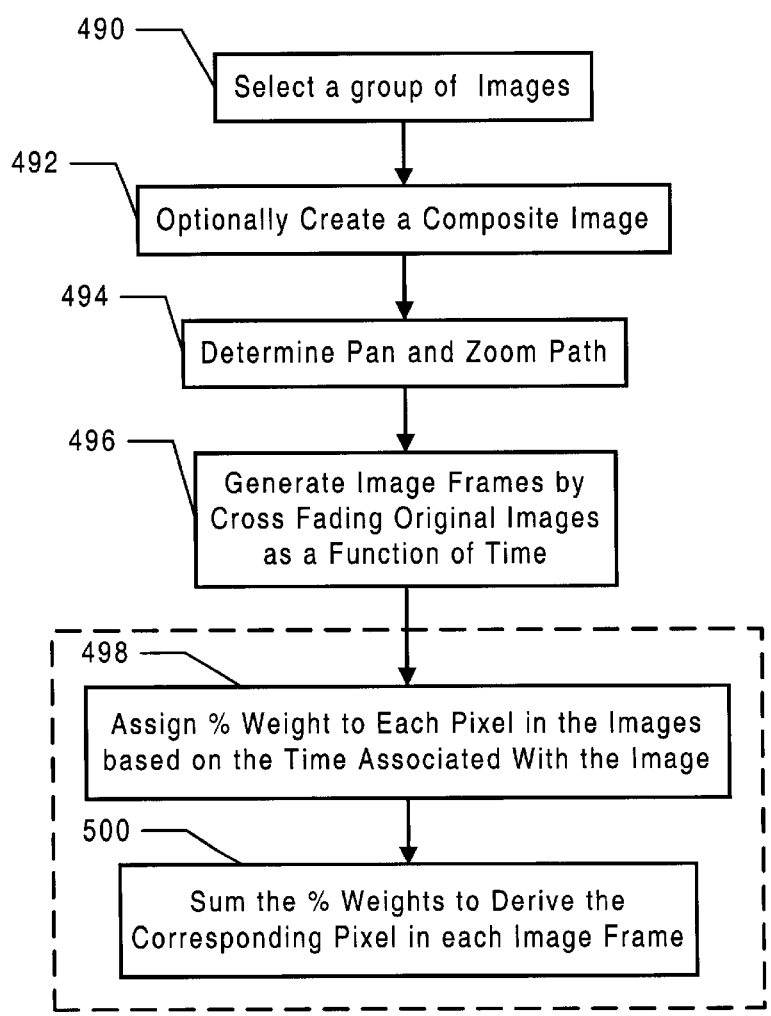
FIG. 9 is a flow chart of an improved process for creating a movie from a group of images that minimizes abrupt scene changes and creates a smoother playing movie.

FIG. 9 is a flow chart of a preferred embodiment for creating a movie from a group of images that minimizes abrupt scene changes and creates a smoother playing movie. The process begins by selecting a group of images to create a movie from in step 490. The group may be selected by capturing individual still images, capturing a sequential image, or selecting from previously stored images.

After selecting a group of images, a composite image 482 may optionally be generated from the group in step 492. Composite image generation is a well-known process in which the common points in two or more images are compared and then made to align to create a blended image.

Next, a panning and zooming path across the composite image 482 is determined in step 494. The reason a composite image 482 is created is to simplify the selection of the panning and zooming path by the user. If no composite image 482 is generated, then the panning and zooming path must be determined across the individual images in the group.

Figure 10A:
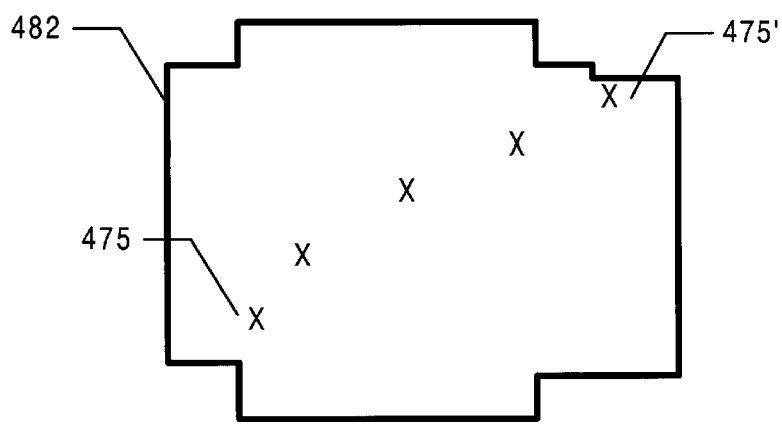
FIG. 10A is a diagram illustrating an example panning and zooming path across the composite image, where the "X's" indicate the path and the location of key image frames.

FIG. 10A is a diagram illustrating an example panning and zooming path across the composite image 482, where the "X's" indicate the panning path and the location of key image frames 475. In this example, the area of selection extends through each image comprising the composite image 482.

Figure 10B:
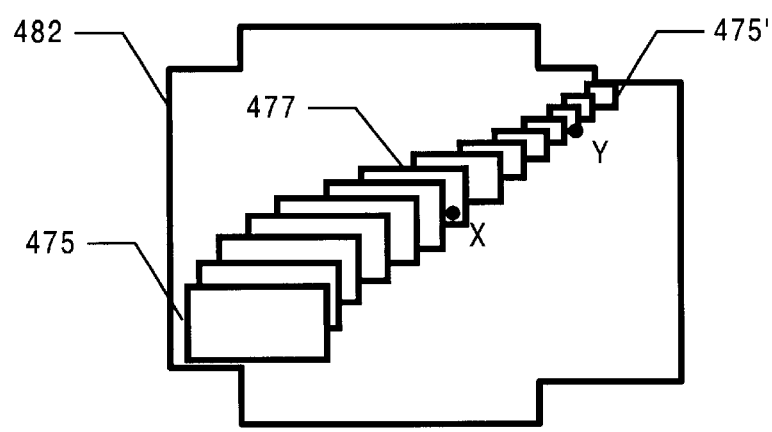
FIG. 10B is a diagram illustrating a portion of the image frames that will be generated along the panning and zooming path.

Referring again to FIG. 9, after the panning and zooming path has been determined, the individual image frames 477 are generated by cross fading the original images in step 496. FIG. 10B is a diagram illustrating a portion of the image frames 477 that will be generated along the panning and zooming path.

According to the present invention, the image frames 477 are generated by cross fading the original images as a function of the time associated with each image. Referring again to FIG. 9, the steps performed during the cross fading process are shown. For each pixel in an image frame, a percentage weight is assigned to each corresponding pixel from each image in the group based on the time associated with each image in step 498. Because the percentages are based on time, pixels in different parts of the image may be assigned different percentages. After the percentage weights are assigned to the pixels, the percentage weights are summed to derive the corresponding pixels in the image frame in step 500.

Referring to both FIGS. 8 and 10B for example, pixel X which will comprise a portion of a particular image frame, lies within a section of the composite image 482 made up of images A, B, and C, while pixel Y lies within a section of the composite image 482 made up of images A and C only.

Figure 10C:
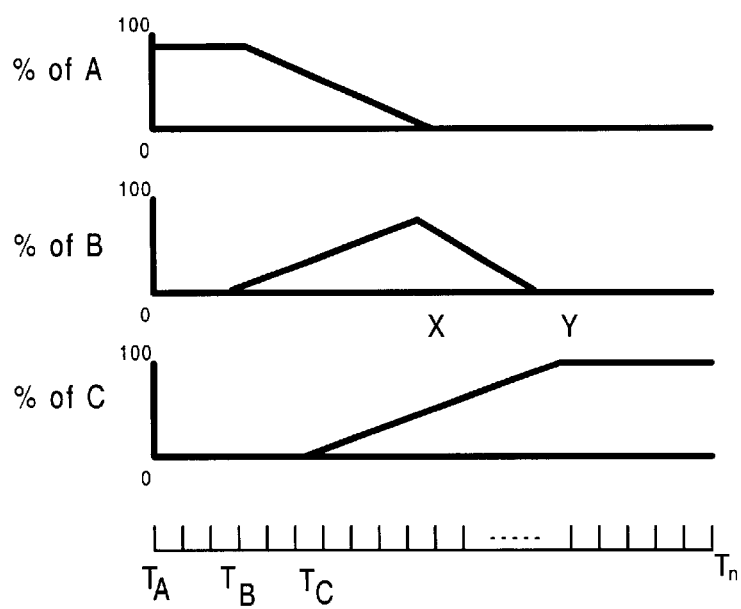
FIG. 10C is a timing diagram showing the percentage of images A, B and C used to generate a cross fade movie in accordance with the present invention.

FIG. 10C is a timing diagram showing the percentage of images A, B and C used to generate a cross fade movie in accordance with the present invention. At time $T_A$, the time associated with image A, 100% of each pixel from image A will be used to generate corresponding image frame pixels up until the time picture B was taken. At time $T_B$, the time associated with image B, A's contribution to the image frames 477 is gradually decreased, while the percentage of B is increased over time to 100%. At time $T_C$, the time associated with image C, the percentage of C is gradually increased.

At this point, image A has almost completely dissolved, and image C begins to take its place. The image frame 477 corresponding to pixel "X" will include almost no percentage of image A, approximately 75% of image B, and approximately 25% of image C. As the percentage of image C approaches 100%, image B's contribution is decreased to 0%. The image frame 477 corresponding to pixel "Y" will include approximately 5% of image B, and approximately 95% of image B. The image frames 477 from this point on are generated from 100% percent of image C.

It should be noted that the percentages of cross fading are shown to vary in FIG. 10C as a linear function. However, the percentages of cross fading can also be computed using other functions, such as a square and cosine function, or a perceptual curve used to create a linear effect, for example. The number of image frames 477 generated by cross fading is a function of the number of frames per second to be displayed and the duration of the movie.

When the resulting series of image frames 477 created using cross fading is displayed at 30 fps, there is a smooth continuous panning motion of the background, while moving objects in the foreground appear to be in motion, although not as smoothly as the background. The movie appears much smoother than it would otherwise because abrupt scene changes between each of the images in the groups are minimized by the cross fading transitions between the group of images. Thus, a high-frame rate movie presentation is created from a low frame-rate still digital camera having limited storing capacity.

In summary, a method and system for interactively creating a movie from one or more still images in a digital camera has been disclosed. Although the present invention has been described in accordance with the embodiments shown, one of ordinary skill in the art will readily recognize that there could be variations to the embodiments and those variations would be within the spirit and scope of the present invention. For example, the present invention may be implemented in other types of digital imaging devices, such as an electronic device for archiving images that displays stored images on a television, for instance. In addition, software written according to the present invention may be stored on a computer-readable medium, such as a removable memory, or transmitted over a network, and loaded into the digital camera for execution. Accordingly, many modifications may be made by one of ordinary skill in the art without departing from the spirit and scope of the appended claims.

What is claimed is:

1. A method for interactively creating a movie from a previously captured digital still image in a hand held digital imaging device, the method comprising the steps of:

a) displaying a stationary view of the digital still image on a display screen;

b) determining a path of panning across the digital still image by determining a location of at least two key frames within the digital still image, wherein each key frame defines an area of pixels within the digital still image, and wherein the location of the key frames in relation to each other determines a path of panning across the digital still image when the movie is subsequently played;

c) calculating image frames along the path of panning between the at least two key image frames; and d) presenting the movie by displaying the first of the at least two key frames, the image frames, and the second of the at least two key frames in sequence on the display screen at a high frame rate.

2. The method of claim 1 wherein step (b) further includes the step of:

i) automatically determining the path of panning.

3. The method of claim 1 wherein step (b) further includes the step of:

i) enabling a user to manually determine the path of panning.

4. The method of claim 3 wherein step (b)(i) further includes the step of:

(1) determining a zoom path across the still image.

5. The method of claim 4 wherein step (b)(i) further includes the step of:

(2) determining the zoom path by varying the sizes of the plurality of key frames.

6. The method of claim 1 further including the step of:

e) storing the movie as a multimedia object for subsequent play back.

7. The method of claim 1 further including the steps of:

e) recording processing parameters for controlling the creation of the movie; and f) calculating the image frames each time the movie is being presented for viewing, to thereby reduce storage space.

8. A hand held image capture device for interactively creating a movie from a previously captured digital still image comprising:

a display screen;

a memory for storing a still image; and processing means coupled to the display screen and to the memory, wherein the processing means includes, means for displaying a stationary view of the digital still image on the display screen, means for determining a path of panning across the still image by determining a location of at least two key frames within the digital still image, wherein each key frame defines an area of pixels within the digital still image, and wherein the location of the key frames in relation to each other determines a path of panning across the digital still image when the movie is subsequently played, means for calculating image frames along the path of panning between the at least two key image frames, and means for presenting the movie by displaying the first of the at least two key frames, the image frames, and the second of the at least two key frames in sequence on the display at a high frame rate on the display screen.

9. The hand held image capture device of claim 8 wherein the processing means automatically determines the path of panning.

10. The hand held image capture device of claim 8 further including a user interface means for enabling a user to manually determine the path of panning across the still image.

11. The hand held image capture device of claim 10 wherein the user determines a zoom path across the still image.

12. The hand held image capture device of claim 11 wherein the zoom path is determined by varying the sizes of the plurality of key frames.

13. The hand held image capture device of claim 8 further including means for storing the movie as a multimedia object for subsequent play back.

14. The hand held image capture device of claim 8 wherein the processor means records processing parameters for controlling the creation of the movie, and calculates the image frames each time the movie is being presented for viewing, to thereby reduce storage space.

15. A computer readable medium containing program instructions for interactively creating a movie from a previously captured digital still image in a hand held digital imaging device, the program instructions for:

a) displaying a stationary view of the digital still image on a display screen;

b) determining a path of panning across the digital still image by determining a location of at least two key frames within the digital still image, wherein each key frame defines an area of pixels within the digital still image, and wherein the location of the key frames in relation to each other determines a path of panning across the digital still image when the movie is subsequently played;

c) calculating image frames along the path of panning between the at least two key image frames; and d) presenting the movie by displaying the first of the at least two key frames, the image frames, and the second of the at least two key frames in sequence on the display screen at a high frame rate.

16. The computer readable medium of claim 15 wherein instruction (b) further includes the instruction of:

i) automatically determining the path of panning.

17. The computer readable medium of claim 15 wherein instruction (b) further includes the instruction of:

i) enabling a user to manually determine the path of panning.

18. The computer readable medium of claim 15 wherein instruction b)(i) further includes the instruction of:
   (1) determining a zoom path across the still image.

19. The computer readable medium of claim 18 wherein instruction (b)(i) further includes the instruction of:
   (2) determining the zoom path by varying the sizes of the plurality of key frames.

20. The computer readable medium of claim 15 further including the instruction of:
   e) storing the movie as a multimedia object for subsequent play back.

21. The computer readable medium of claim 15 further including the steps of:
   e) recording processing parameters for controlling the creation of the movie, and
   f) calculating the image frames each time the movie is being presented for viewing, to thereby reduce storage space.

22. A method for interactively creating a movie from a group of digital still images in a hand held digital imaging device, the method comprising the steps of:
   a) allowing a user to select a group of previously captured digital still images, each of the digital still images taken at substantially a different time and each comprising a plurality of pixels;
   b) blending the group of digital still images into a composite still image and displaying a stationary view of the composite still image on a display screen;
   c) determining a path of panning across the composite still image by determining a location of at least two key frames within the composite still image, wherein each key frame defines an area of pixels within the composite still image, and wherein the location of the key frames in relation to each other determines a path of panning across the composite still image when the movie is subsequently played;
   d) calculating a set of image frames along the path of panning between the at least two key image frames by cross-fading the group of still images as a function of time; and
   e) playing the movie by displaying the first of the at least two key frames, the image frames, and the second of the at least two key frames in sequence on the display screen at a high frame rate.

23. The method of claim 22 wherein step (d) further includes the step of:
   i) for each pixel in each one of the image frames, assigning a percentage weight to each corresponding pixel from each image in the group of images based on the time associated with the image; and
   ii) summing the assigned percentage weights to derive the pixels in the image frame.

24. The method of claim 22 wherein step (a) further includes the step of:
   i) defining a zoom path across the composite still image.

25. The method of claim 24 further including the step of:
   ii) defining a zoom path across the composite still image by varying the sizes of the at least two of key frames.

26. A method for interactively creating a movie from a previously captured digital still image on a digital camera having a display, method comprising the steps of:
   a) displaying a stationary view of the digital still image on the display in response to a user placing the camera into a play mode;
   b) allowing the user to determine a path of panning across the digital still image for the movie by locating at least two key frames within the digital still image, wherein each of the at least two key frames defines an area of pixels within the digital still image, and the location of the key frames in relation to each other determines the path of panning when the movie is subsequently played:
   c) calculating a number of image frames to generate between each pair of key frames based on a frame rate at which the movie will be displayed, wherein each of the image frames defines an area of pixels within the image;
   d) determining a position of each of the image frames on the image using pixel coordinates; and
   e) presenting the movie on the display by displaying the first of the at least two key frames, the image frames, and the second of the at least two key frames in sequence and at a frame rate of approximately thirty frames per second.

27. The method as in claim 26 wherein step d) further includes the step of determining the position of each of the image frames using one of a linear function and a curve fitting function.

28. The method as in claim 27 wherein step d) for determining a position of each of the image frames using a linear function further includes the step of:
   i) assuming a coordinate of a first image frame is (A, B) and that a coordinate of the $M^{th}$ image frame is (C, D), calculating a coordinate (X, Y) of an $N^{th}$ image frame that is located between the first image frame and the $M^{th}$ image frame by $X=A+N(C-A)/(M-1)$ $Y=B+N(D-B)/(M-1)$.

29. The method as in claim 27 wherein step d) for determining a position of each of the image frames using a linear function further includes the steps of:
   i) assuming a coordinate of a first image frame is (A, B) and that a coordinate of the $M^{th}$ image frame is (C, D), calculating a positional X, Y offset ($\Delta$) between each of the frames by $\Delta X=(C-A)/(M+1)$ $\Delta Y=(D-B)/(M+1)$;

and
   ii) calculating a coordinate (X, Y) of an $N^{th}$ image frame located between the first image frame and the $M^{th}$ image frame by adding $\Delta X$ and $\Delta Y$ to a position of an N−1 image frame.

30. The method as in claim 27 wherein step b) further includes the steps of:
   i) allowing the user to change the size of the key frames within the still image in order to simulate zooming in or out of the still image.

31. The method as in claim 30 wherein step d) further includes the steps of:
   i) determining boundaries of each of the image frames between a pair of adjacent key frames by calculating slopes between respective corners of the adjacent key frames, and using the slopes to determine the bound- ;jaries of each of the image frames, wherein the boundaries are represented by X, Y coordinates.

32. The method as in claim 27 wherein step e) further includes the step of:
   i) resizing image data within the at least two key frames and the image frames to fit the display prior to playing the movie.

33. The method as in claim 32 wherein step e) further includes the step of:
   ii) discarding the at least two key frames and the image frames after playing the movie to reduce storage requirements.

34. The method as in claim 33 wherein step e) further includes the step of:
   ii) storing the at least two key frames and the image frames for subsequent playback.

35. The method as in claim 33 wherein step e) further includes the step of:
   ii) storing processing parameters regarding locations and sequences of the at least two key frames and the image frames, and performing image processing on the still image each time the movie is to be played.

* * * * *